Figure 1:
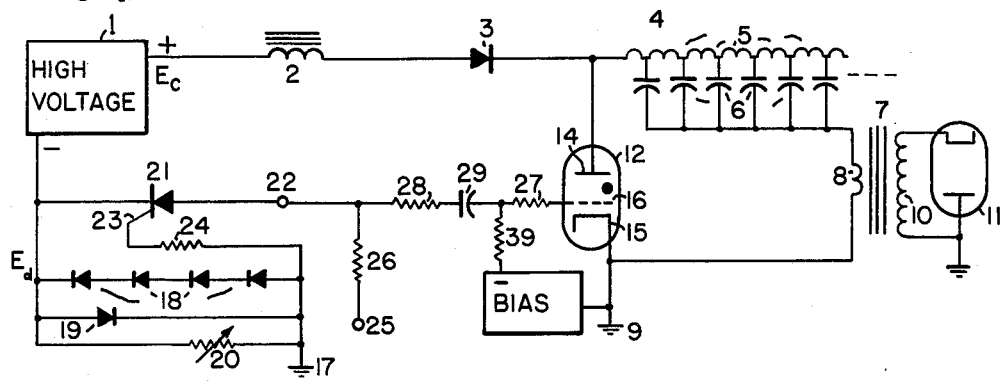

Sept. 21, 1965          C. THEODORE ETAL                    3,207,994
              TRIGGER-CHARGING CURRENT INTERLOCK FOR PULSE MODULATOR
Filed March 11, 1963                                    2 Sheets-Sheet 1

TIME →

INVENTORS
CHARLES THEODORE
BY EUGENE T. PERUSSE

Harry R. Lubcke
AGENT

INVENTORS
CHARLES THEODORE
BY EUGENE T. PERUSSE

*Harry R. Lubcke*
AGENT

United States Patent Office 3,207,994
Patented Sept. 21, 1965

3,207,994
TRIGGER-CHARGING CURRENT INTERLOCK
FOR PULSE MODULATOR
Charles Theodore, Los Angeles, and Eugene T. Perusse,
West Covina, Calif., assignors to Ling-Temco-Vought,
Inc., Dallas, Tex., a corporation of Delaware
Filed Mar. 11, 1963, Ser. No. 264,267
13 Claims. (Cl. 328—67)

Our invention relates to electrical pulse-producing devices and particularly to a method of operating the same in which reliability is enhanced.

Pulse modulators are employed to supply energizing voltage for a variety of electronic equipments; including radar, linear accelerators and other apparatus having a brief duty cycle. Often, the power represented in the pulses produced reaches the hundred megawatt level. Invariably, regardless of power level, ionized gaseous or solid state carrier conduction is employed to short a chargeable resonant structure to produce the brief high-amplitude pulse of electrical energy desoired. Such devices have certain shortcomings. They may trigger spontaneously at times because of conditions internal to the ionized current flow device. When this occurs, subsequent normal triggering occurs at abnormal current levels and the device does not subsequently deionize. The shorting current increases until the overload protection on the source of electrical power for the modulator and the modulator "goes down" in the nomenclature of the trade; that is, it ceases to function until re-started.

For this, or other reasons to be later considered, it is important that an ionizable shorting device be triggered only when the charging current from the power source to chargeable means shall have ceased, or have dwindled to a low value. This insures a rhythmic flow of current of substantially equal maxima for each cycle of operation and the absence of current available at the anode of the shorting device for the minimum of each cycle. The presence of current at the anode for all time prevents necessary deionization of the shorting device after the shorting function has been accomplished and this leads to malfunctioning of the modulator.

We have been able to enhance the reliability of these modulators by providing an interlock of electrical nature between the triggering operation of the shorting device, or "shorting switch" as it is often called, and the current flowing from the power source. The interlock allows operation of the trigger function only when the current flowing from the power source is zero or a small minimum value.

This has prevented the firing of the shorting device due to spontaneous causes, due to triggering-like pulses and to surges arising from the actuation of other parts of the modulator apparatus and from the starting operation of the modulator. The greatest irregularity of operation which then occurs is the omission of one power pulse. This is a small price to pay for alleviating a condition which would otherwise result in the modulator going down, with the loss of thousands of pulses.

An object of our invention is to provide a method of operating a pulse type modulator wherein spurious triggering influences are inhibited.

Another object is to operate a shorting switch type device in a pulse type modulator only when the current from the power source to the chargeable means is essentially zero.

Another object is to provide a selection of current-sensing means for inhibiting triggering operation of the shorting device of a pulse type modulator.

Other objects will become apparent upon reading the following detailed specification and upon examining the accompanying drawings, in which are set forth by way of illustration and example certain embodiments of our invention.

Figure 2:
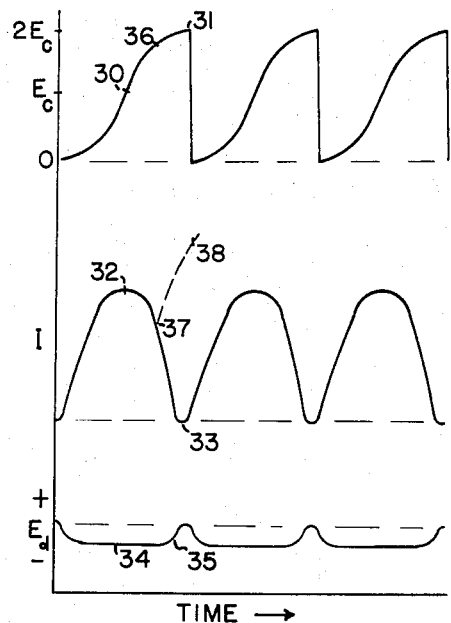
Figure 3:
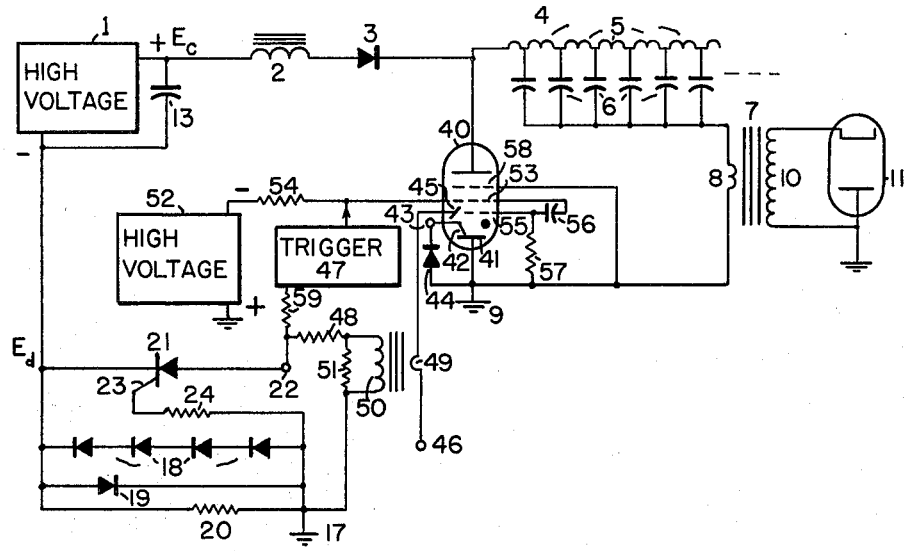
Figure 4:
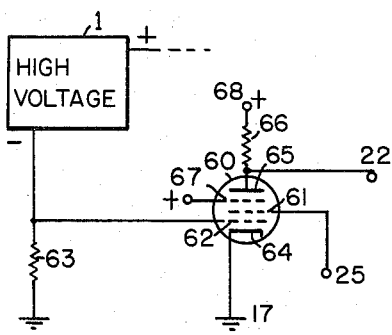
Figure 5:
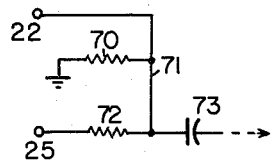

FIG. 1 shows an embodiment of our invention which employs a gaseous conduction shorting switch device of the nature of a hydrogen thyratron, FIG. 2 shows electrical waveforms which appear in apparatus operating according to the method of our invention, FIG. 3 shows an alternate embodiment in which the shorting switch device is an ignitron, FIG. 4 shows fragmentarily an alternate embodiment in which a vacuum tube is employed to accomplish the inhibiting function, and FIG. 5 shows fragmentarily another alternate embodiment in which a series-adder type of circuit is employed for applying inhibition to trigger of the shorting switch.

In FIG. 1 numeral 1 indicates a high voltage power source per se, having positive and negative terminals as shown. This source may be anything from a battery of nominal voltage to an alternating current-to-direct current power supply having an output voltage of many kilovolts and a direct current capability of a number of amperes at that voltage. In this art the latter source is typical.

To the positive terminal is connected inductor 2, typically having an iron core and an inductance of the order of 2.5 henries. The combination of the power supply 1 and inductor 2 comprises a power source having an impedance; more explicitly, an inductive impedance.

The anode of diode 3 is connected to the inductor 2 and the cathode of the diode is connected to the input section of a known transmission or delay line 4. This line is typically composed of series-connected inductors 5 and shunt-connected capacitors 6. The hole series of inductors employed may have a total inductance of 9 microhenries and the whole group of capacitors a total capacitance of one-fourth microfarad. The line may be composed of 24 sections, with non-inductively coupled inductors and each section separately tunable. The characteristic impedance is low, of the order of five ohms.

A pulse transformer 7 has a primary 8 connected to the common terminal of capacitors 6 and to a common return path (or ground) 9. The secondary 10 of transformer 7 provides a step-up of voltage for a typical load, klystron 11; the secondary being connected to the anode and to the cathode thereof. Our modulator is not restricted to this type of load. Any type of load requiring pulse energization may be powered according to our method and apparatus.

Tube 12 is illustrative of the shorting switch device, the purpose of which is to very quickly discharge the line 4 through primary 8 to form the brief but powerful electrical pulse for energizing the load. In FIG. 1 this tube is shown as a gaseous filled tube of which the hydrogen thyratron is typical. Anode 14 is connected to the junction between the cathode of diode 3 and the input section of line 4, while cathode 15 is connected to ground 9. Grid 16, upon receiving a positive voltage pulse, initiates the ionized discharge in tube 12 and so the short to produce the pulse of electrical energy for the load.

The electronic interlock between the trigger, grid 16, and the status of current flow in the charging circuit resides in the network of elements connected between the negative terminal of high voltage source 1 and the ground, or common connection, 17.

The series-connected group of diodes 18 forms the sensing element for the flow of charging current. With the anodes connected toward ground and the cathodes toward the negative terminal of power supply 1, as shown, these diodes are in forward conduction when charging current is flowing. The voltage drop across each diode is thus of the order of a fraction of a volt and the voltage drop across the series group is of the order of one to two volts; say 1.5 volts.

Diode 19 is connected across the group of diodes 18 in reverse polarity with respect to the polarity of the diodes in the group. Diode 19 provides a path back, from the negative terminal of supply 1 to ground 17, to pass any voltage pulses which might arise and cause conduction through diodes 18 to cease even though the flow of charging current may not have ceased. This path back is of low impedance and so at point 22, through controlled rectifier 21, an effective short circuit is provided at the junction of resistors 26 and 28 when controlled rectifier 21 is conducting. This effectively eliminates the trigger pulses from grid 16 of the switch device 12, as will be more fully explained later.

To minimize transients across the diodes and also to provide a threshold effect, a resistor 20 is also connected from the negative terminal of supply 1 to ground 17. This resistor may have a resistance of the order of ten ohms. It has been shown variable in FIG. 1 to indicate how the threshold effect may be altered from time to time to suit long term operating conditions.

Element 21 functions to provide essentially a short between terminal 22 and ground when charging current is flowing in the modulator to ground 17 and to provide essentially an open circuit when this current is not flowing. In this way triggering of the switch tube is inhibited or not, as the conditions may be. A controlled rectifier, which may employ a semiconductor material as the chief current-carrying material, such as the known silicon controlled rectifier, as type No. C15B, is suited for element 21. The cathode thereof is connected to the negative terminal of supply 1, the anode is connected to terminal 22 and the control electrode 23 is connected to ground 17 through resistor 24. This resistor is to prevent excessive control electrode current and may have a resistance of the order of ten ohms.

The inhibiting process takes place in the following manner.

Upon control electrode 23 having a sufficient voltage impressed upon it, it breaks down controlled rectifier 21 and so provides essentially a short circuit between the anode and the cathode thereof. What voltage is impressed upon the control electrode depends upon the impedance between the negative terminal of power supply 1, which is also the potential of the cathode of rectifier 21, and ground 17, and also upon the current which flows through this impedance.

It will be seen that variation of the resistance value of resistor 20 alters this impedance. If this is decreased a considerable current may flow as a residual of the charging current of the modulator and still not result in controlled rectifier 21 being "fired." In this way our device may be adjusted to take advantage of other known performance characteristics contributing to safety in modulator operation.

One such characteristic is that of the output transformer. In known embodiments this transformer may have a negative overswing of voltage occur at the end of the discharge pulse. This acts to deionize the switch tube 12 and so a residual of charging current from power supply 1 may be allowed. Another characteristic that may be employed in the same way is obtained by arranging the impedance match between the load and the pulse modulator so that a reflection occurs of negative voltage polarity at anode 14 of switch tube 12. This acts to deionize this tube at the end of the shorting discharge thereof.

The number of diodes 18 employed depends upon the sensitivity of the control electrode 23 to voltage levels impressed upon it and also to the current normally supplied by the power supply. Where the average current is of the order of four amperes and the peak current fifty percent greater than this, four diodes of 1N2154 type provide a proper voltage drop when conducting in the forward direction to activate the control electrode of a General Electric C15B silicon controlled rectifier. If the current were greater, the drop across each diode greater or the control electrode more sensitive, fewer diodes 18 could be employed and vice versa.

In FIG. 1 the timed trigger pulses are provided at terminal 25. These are of positive polarity and have an amplitude of the order of 250 volts for impressing upon the grid of a typical hydrogen thyratron 12. These pulses are provided from a known source, such as a "rep. rate generator." Resistor 26 is connected between terminals 25 and 22 and allows the shorting effect of the controlled rectifier 21 to be effective in removing the trigger pulses from grid 16. Resistor 27 is connected directly to the grid and is the known grid current limiting resistor employed with ionization-conducting devices such as thyratrons. Resistor 26 has a resistance of the order of fifty ohms and resistor 27 a resistance of a few ohms in a typical embodiment. Resistor 28 and capacitor 29 are connected in series between terminal 22 and resistor 27 and allow the trigger pulses from terminal 25 to pass through to grid 16 when terminal 22 is not shorted by controlled rectifier 21. Capacitor 29 allows an independent bias to be maintained upon grid 16 from the "bias" supply, which supply is connected between resistor 39 and ground 9. Resistor 39 is also connected to resistor 27 and provides current limiting for the bias supply, to prevent shorting of the same during the time when the positive trriggering pulse from terminal 25 is upon grid 16.

The functioning of our apparatus is further explained in connection with the waveforms of FIG. 2. Time is the abscissa. In the upper waveform the ordinate is $E_c$, or the charge voltage as measured at anode 14 of thyratron 12. The value corresponding to unity times $E_c$ occurs at substantially half way up what is essentially a half sine wave, as at point 30. Because the transmission line 4 is a resonant structure it charges to approximately twice this voltage, or $2E_c$, as identified by point 31 in FIG. 2.

The current I, which flows in the series circuit 17, 18, 1, 2, 3, 4, 8 and 9 is shown as the ordinate for the middle waveform 32 of FIG. 2. It will be noted that each of the excursions 32 are essentially half sine wave shapes which are out of phase with respect to the charge voltage $E_c$. For example when the voltage $E_c$ to which the line is charged is equal to the voltage from high voltage source 1 the current I from this source is a maximum, at point 32. When the voltage $E_c$ has resonantly risen to $2E_c$, at point 31, the current is essentially zero, at point 33, and so on for each cycle, three of which are shown.

In the same way, voltage $E_d$ is the voltage primarily across diodes 18. This is negative with respect to ground. It has a constant negative value 34 as long as a significant amplitude of current 32 is flowing, but reduces to zero volts when the current is zero, as it is at 33. When resistor 20 has a relatively small value it decreases the amplitude of waveform 34 and the non-inhibiting time, as at 35, is increased.

The objective in operating any pulse modulator is to achieve continued flawless performance according to the three cycles of operation set forth as waveforms $E_c$ and I of FIG. 2.

It might be mentioned in passing that these waveforms illustrate essentially the maximum repetition ("rep.") rate at which this particular embodiment may be operated. That is, the resonant time (LC) of the line inductors 5, capacitors 6, in combination with the inductance of inductor 2, is such that the maximum double voltage at point 31 on the $E_c$ waveform occurs at a time corresponding to the abscissa of this point.

If it is desired to operate the modulator at a lower repetition rate the waveshape from time zero to time 31 on the voltage waveform and the equivalent time to 33 on the current waveform remains the same. However, the voltage on the charged line 4 at point 31 just remains at this maximum value for an interval of time until the next trigger pulse arrives at the grid of thyratron 12. No more current I flows in this interval. For lower repetition rates, therefore, the waveforms have a large time magnification in the vicinity of Points 31 and 33. This time magnification may extend to ten times or more the period of one of the half sine waves, for slow repetition rates.

Assuming that the conditions of the rapid repetition rate apply for purposes of illustration, the event of a spontaneous triggering of switch tube 12 may occur at a random time, say at point 36 on the $E_c$ voltage curve of FIG. 2. This corresponds to point 37 on the I current curve. What happens is that the current I increases relatively rapidly, from the value at point 37 toward values which even exceed the normal maximum shown at 32. This is because not only is line 4 taking current, but also is tube 12 taking very much current due to its low impedance when in the ionized conduction condition. The shape of the dotted fault current starting at point 37 is substantially a portion of a sine wave due to the inductance of inductor 2 controlling the current flow from power supply 1.

When the normal time for the next triggering pulse to arrive occurs at time 33, instead of the current through tube 12 being zero it has an abnormally high value 38. Although line 4 discharges typically in a few microseconds to render the power pulse of normal duration, current still flows from power supply 1. The switch tube 12 cannot deionize and the current flow from the power supply continues to increase until the overload protection for power supply 1 actuates and the whole modulator is shut down as a consequence. The overload protection device is not explicitly shown in FIG. 1, but it is a well-known element within the rectangle 1 in FIG. 1.

When the method and apparatus of our invention is employed it is seen that an undesirable circumstance of this type is not allowed to develop.

Controlled rectifier 21 "clamps," at low impedance, the potential of grid 16 to a few volts negative at all times save when a proper triggering pulse is scheduled to occur. This is essentially the waveform $E_d$ of FIG. 2. Only the small forward drop through controlled rectifier 21 decreases the amplitude of this waveform. As a consequence, transients from other circuits are not reproduced upon grid 16. Furthermore, since the grid is held slightly more negative than is normal potential, internally originated bursts of ionization tend to be prevented. As a result, only at and very close to the time that the clamp voltage is removed; i.e., at and near time 35 in the lower waveform of FIG. 2, is shorting tube 12 placed in a condition to accomplish a shorting function.

The practical result obtained upon the application of this invention to a full-scale pulse modulator having a 20 kilovolt power supply and giving peak power supply currents of 6.5 amperes is almost perfect continuous operation. Instead of "going down" once every hour or so, with the loss of thousands of power pulses to the load, only one such pulse is lost and the modulator continues on in otherwise perfect operation.

An almost inescapable transient occurring in the practical operation of pulse modulators arises when one of the push-buttons on the rep. rate generator is actuated for the purpose of changing from one repetition rate to another. It will be understood that to fortuitously push a button at the relatively brief time interval in which the modulator may properly accept a triggering pulse; i.e., at or very near time 33 in FIG. 2, is something that can be accomplished only infrequently. However, with our invention, the long clamp period of waveform 34 makes switch tube 12 insensitive to any triggering pulse. Thus, the transient due to the change of rep. rate is ignored by the modulator and it continues in operation.

Similarly, if one attempts to place the modulator into operation at full operating voltage from high voltage power supply 1, the operation of the push-button to apply the voltage will create an important transient. It is therefore difficult to accomplish this type of operation with the modulator apparatus alone, but with our apparatus functioning the transient does not reach the switch tube and the modulator may be easily started in this manner when desired.

We now turn to the alternate embodiment of a pulse modulator employing our invention as disclosed in FIG. 3.

Both the modulator and our apparatus are largely the same as in FIG. 1, and for similar elements the same numerals have been used in both figures for identification. The differences lie in the type of shorting switch element and the connection of the inhibiting apparatus thereto. The switch element is shown as an ignitron, such as the known General Electric ignitron, rather than a thyratron or a solid state equivalent.

In FIG. 3, capacitor 13 is a filter reservoir capacitor having a capacitance of a number of microfarads. It is connected across the positive and the negative terminals of the power supply. Elements 2 through 9 and 17 through 24 are constituted, connected and function substantially the same as disclosed in connection with the embodiment of FIG. 1.

Ignitron 40 and the elements surrounding the same have to do with the operation of this switch tube. These are disclosed in the application of James A. Ross, Serial No. 142,929, filed October 4, 1961, now Patent No. 3,088,074, entitled "Pulse Former Using Gas Tube with Substantially Grounded Suppressor and Negative Pulse for Rapid Deionization."

Briefly recounting this material, an arc is formed between the pool of mercury, cathode 41, and ignitor electrode 42 by application of a timed power pulse at terminal 43. Diode 44 prevents a reverse potential upon the ignitor "rod." In pulsed sequence, holding anode 45 is energized by a positive pulse introduced at terminal 46. This sustains the arc. Current flowing in this circuit indicates that the ignitron is in condition to fire when subsequently triggered.

Fulfillment of this condition is imposed upon trigger 47 (and control circuit therefor) through a transformer having primary 49 in the holding anode circuit and secondary 50 connected to the trigger control within rectangle 47 through resistors 48 and 59. Resistor 48 has a value of the order of ten ohms and resistor 59 of fifty ohms.

According to this invention, terminal 22, which has the inhibiting voltage present when current is flowing from power supply 1, is also connected through resistor 59 to the trigger control within rectangle 47. The operation is such that if either there is a lack of current in the holding anode circuit or if the inhibition action according to this invention is in force, triggering from entity 47 will be inhibited. It will be seen that the shorting effect of controlled rectifier 21 at the junction of resistors 48 and 59 is such as to prevent the normal voltage arising at secondary 50 due to the proper ignition of the arc to the holding anode from appearing at that secondary; thus inhibition at trigger 47. Resistor 51 has a resistance of the order of ten ohms and acts to stabilize the transformer circuit.

High voltage source 52 provides a negative potential upon grid 53 for proper operation of the ignitron. Resistor 54, connected thereto, provides an impedance over which the trigger pulse from entity 47 may be applied to control grid 53. This triggering pulse is also impressed upon shield grid 55 through capacitor 56. Shield grid 55 is also connected to ground through resistor 57. Gradient grid 58 is connected directly to ground at 9. If specific values for the several electrical components not given herein are required these may be taken from the Ross patent, which has been referred to.

In overall effect, ignitron 40 takes the place of thyratron 12 of FIG. 1 and when provided with a properly timed trigger pulse in the absence of inhibiting by our elements 17 through 24, the ignitron fires, producing the desired pulse of high-voltage, high-current power for load 11. In FIG. 3, our inhibiting circuit is merely combined with another inhibiting circuit and caused to control the release of a triggering pulse from the triggering generator, rather than being applied directly to a triggering electrode of a shorting ionizable conduction tube.

FIG. 4 shows an alternate inhibiting circuit for accomplishing our method. The important departure from prior embodiments is the substitution of vacuum tube 60 for elements 18 through 21.

Vacuum tube 60 has two control grids, being for example, the known 6AS6 type. One of the control grids, 61, is connected to terminal 25; to which triggering pulses are applied, as in FIG. 1. To the other control grid 62, is applied the inhibiting voltage according to this invention. In FIG. 4 this voltage is produced by resistor 63, which has a low value of resistance, such as produces, say, 20 volts with the current flowing from power supply 1. Since the full voltage of this power supply is typically 20 kilovolts (20,000 volts), it is seen that the resistance value is small.

It is evident that when an inhibiting current is flowing, vacuum tube 60 is "cut off" by the relatively large negative potential on grid 62 with respect to the ground potential impressed upon cathode 64. Any triggering or spurious pulses impressed upon grid 61 will thus be impotent to produce an output from tube 60 during this cut off condition. Such an output, when permitted for proper triggering pulses according to this invention, appears as a voltage at anode 65, having built-up by current flow through resistor 66. This voltage is conveyed to output terminal 22, for use in triggering the switch tube of the embodiment involved. It will be understood that a positive pulse of considerable magnitude is required for triggering of a thyratron or equivalent and so a negative polarity of triggering input pulse at 25 is preferable unless phase-reversing amplification follows terminal 22. Screen grid 67 is present in vacuum tube 60 and is provided with a known positive voltage for operating the tube, as is also the anode at terminal 68.

An automatic aspect of our method lies in the fact that if the pulse repetition rate is increased beyond that for which the modulator can operate, say to twice that rate, malfunctioning does not result, but every other trigger pulse is inhibited, thus retaining operation at half the abnormally fast rate. It will be understood that modulator embodiments may be had for relatively fast rates into the thousands of pulses per second by decreasing the inductance of charging choke 2. There will always be a frequency limit to practical modulators, however, due to the time required for deionization of the shorting switch tube, etc. With our invention an abnormally fast rate can, in all instances, be altered to one which the apparatus can effectively use.

FIG. 5 shows a series-adder type of circuit for impressing inhibition conditions upon the grid of a shorting switch tube. This circuit takes the place of the shunt clamping type of connection given in FIGS. 1 and 3.

In FIG. 5 the inhibiting voltage, as waveform 34 of FIG. 2, in the negative polarity shown is impressed upon terminal 22. A return path to ground is provided through resistor 70. The triggering pulse, in positive polarity, is impressed upon terminal 25. This pulse passes to a junction, represented as conductor 71, through resistor 72. The amplitude of the inhibiting voltage is arranged to be sufficiently negative so that when the positive triggering pulse occurs during a time when current is flowing from power supply 1, the negative inhibiting voltage overcomes the positive pulse and the critical voltage to fire the switch tube is not obtained at conductor 71. The resulting voltage is conveyed (as a pulse) through capacitor 73 to either resistor 27 of FIG. 1, trigger 47 of FIG. 3, or an equivalent shorting switch of other embodiments.

Since a nominal power is demanded of a triggering pulse for ionized flow devices such as thyratrons and ignitrons, each of the resistors in FIG. 5 have a resistance value less than one hundred ohms. In the connection of the circuit of FIG. 5 to that of FIG. 1, capacitor 73 takes the place of capacitor 29.

It is to be understood that if the shorting switch device is of the solid state type, such as a Shockley multilayer diode or a silicon controlled rectifier, our inhibiting invention is equally applicable. These semiconductor devices perform in a manner similar to the thyratrons and ignitrons, in that voltage may not be re-applied to the anodes until deionization (and/or its solid state equivalent) has been accomplished. Both the method of operation and the circuits for the apparatus are the equivalents of the method and apparatus herein described.

Alternate elements may also be employed within the teaching of our invention. For low circuit losses, the iron core of indicator 2 may be omitted and more turns of wire employed to roughly retain the same inductance, in FIGS. 1 and 3.

The values of circuit elements, voltages and currents given in the typical embodiments detailed herein may be scaled upward or downward for larger or smaller power capabilities of the modulator.

Having thus fully described our invention and the manner in which it is to be practiced, we claim:

1. In an electrical modulator having a load,
   chargeable means connected to said load,
   a power supply to charge said chargeable means connected thereto, and
   switch means having a trigger,
   said switch means connected to discharge said chargeable means,
   means to inhibit operation of said trigger when said charge is flowing into said chargeable means comprising
   means to provide a voltage when said charge is flowing, said means-to-provide-a-voltage connected to said power supply and to said load and said chargeable means,
   an element having impedance and means to control its impedance between two values, said element connected between said means-to-provide-a-voltage and the trigger of said switch means to render said trigger inoperative when said element is at its low impedance value,
   and means to connect said means-to-control said element across said means-to-provide-a-voltage whereby said means-to-control reduces the impedance of said element to the low value when a voltage is provided by said means-to-provide-a-voltage.

2. The electrical modulator of claim 1, in which said means-to-provide-a-voltage comprises
   a diode having a voltage drop across it when said diode is in the conducting state.

3. The electrical modulator of claim 1, in which said means-to-provide-a-voltage comprises
   plural diodes connected in series having a voltage drop thereacross when said diodes are in the conducting state.

4. The electrical modulator of claim 1, in which said means-to-provide-a-voltage includes
   a diode poled to provide an impedance value for said means-to-provide-a-voltage low with respect to said impedance value in the absence of said diode.

5. The electrical modulator of claim 1, in which
   a resistor is connected across said means-to-provide-a-voltage whereby the voltage provided by said means is reduced.

6. The electrical modulator of claim 1, in which
   a variable resistor is connected across said means-to-provide-a-voltage and the voltage at which triggering is inhibited is altered by adjusting said variable resistor.

7. The electrical modulator of claim 1, in which
   said element is a controlled rectifier employing a semiconductor material for the conduction of current.

8. The electrical modulator of claim 1, in which
   said switch means is a thyratron having a grid and said element is connected to said grid for accomplishing inhibition of triggering.

9. The electrical modulator of claim 1, in which
said switch means is an ignitron having an external trigger circuit and said element is connected to said trigger circuit for inhibiting triggering.

10. In an electrical modulator having a load,
chargeable means connected to said load,
a power supply to charge said chargeable means connected thereto, and
switch means having a trigger,
said switch means connected to discharge said chargeable means,
means to inhibit operation of said trigger when said charge is flowing into said chargeable means comprising
means to provide a voltage when said charge is flowing, said means-to-provide-a-voltage connected to said power supply by a connection and to said load and said chargeable means,
a vacuum tube having two input electrodes and an output electrode,
one of said input electrodes connected to the connection between said power supply and said means-to-provide-a-voltage,
the other of said input electrodes connected to a source of triggering electrical energy, and
said output electrode connected to said trigger,
whereby the potential impressed upon said one input electrode is such as to prevent triggering electrical energy from appearing at said output electrode when said charge is flowing into said chargeable means.

11. In a pulse modulator having a load,
an electrically chargeable transmission line connected to said load,
a power supply having first and second output terminals,
an inductor connected between the first output terminal of said power supply and said line for charging said line, and
triggerable means having a trigger for periodically shorting said line through said load,
means to inhibit triggering said triggerable means when said line is being charged from said power supply comprising
a controlled semiconductor device having a control, said semiconductor device connected between the second of said output terminals of said power supply and the trigger of said triggerable means by a connection
whereby triggering electrical energy is bypassed from said trigger when said semiconductor device is conducting electricity,
and unilateral conductive means connected between the second of said output terminals of said power supply, a common circuit including said load and said line, and the control of said controlled semiconductor device,
whereby said unilateral conductive means conducts when said line is being charged.

12. The pulse modulator of claim 11, in which the connection between said semiconductor device and said trigger includes
a first resistive impedance connected between said connection and said common circuit, and
a second resistive impedance connected between said connection and a source of triggering electrical energy,
in which the polarity of voltage across said first resistive impedance opposes that across said second resistive impedance.

13. In an electrical pulse modulator having a load,
an inductance-capacitance transmission line,
a transformer connecting said line to said load,
an electrical power supply having positive and negative terminals,
an inductor and a diode connected in series between the positive terminal of said power supply and said line for charging said line,
and a switch tube having means for triggering, said switch tube connected for periodically shorting said line and said transformer in series,
means to inhibit triggering said switch tube when said line is being charged from said power supply comprising
a controlled rectifier having a control electrode, said controlled rectifier connected between the negative terminal of said power supply and the means for triggering said switch tube,
whereby a triggering pulse is bypassed from said means for triggering when said controlled rectifier is conducting,
a common ground which completes the circuit for current flow from said power supply through said transformer,
plural series-connected diodes connected between the negative terminal of said power supply and said common ground, whereby said plural diodes are forward biased when said current flows,
one diode connected across said plural diodes in opposite polarity to the polarity of connection of said plural diodes,
a resistor connected across said one diode to provide an adjustment of the inhibiting effect upon said means to trigger, and
a connection from said common ground to the control electrode of said controlled rectifier for causing said controlled rectifier to conduct when current is flowing through said plural diodes.

References Cited by the Examiner

UNITED STATES PATENTS

| | | | |
|---|---|---|---|
| 2,514,413 | 7/50 | Pawley | 320—1 X |
| 2,830,178 | 4/58 | White | 328—67 X |

ARTHUR GAUSS, *Primary Examiner.*